United States Patent [19]

Krüger

[11] Patent Number: 5,031,582
[45] Date of Patent: Jul. 16, 1991

[54] INTERNAL COMBUSTION ENGINE PROVIDING SCAVENGING WITH COMBUSTION CHAMBER VOLUME CONTROL

[75] Inventor: Hermann Krüger, Wolfsburg, Fed. Rep. of Germany

[73] Assignee: Volkswagen AG, Wolfsburg, Fed. Rep. of Germany

[21] Appl. No.: 499,904

[22] Filed: Mar. 27, 1990

[30] Foreign Application Priority Data

Apr. 26, 1989 [DE] Fed. Rep. of Germany ....... 3913669

[51] Int. Cl.⁵ .................. F02D 13/02; F02B 25/20; F02B 29/00; F01L 1/40
[52] U.S. Cl. .................................. 123/90.15; 123/316
[58] Field of Search ............... 123/90.15, 90.16, 90.17, 123/48 A, 65 BA, 559.1, 316, 308, 432

[56] References Cited

U.S. PATENT DOCUMENTS

| | | | |
|---|---|---|---|
| 2,292,233 | 8/1942 | Lysholm | 123/316 |
| 2,773,490 | 12/1956 | Miller | 123/90.16 |
| 3,015,934 | 1/1962 | Miller | 123/316 |
| 3,496,918 | 2/1970 | Finlay | 123/90.15 |
| 3,741,175 | 6/1973 | Rouger | 123/48 A |
| 3,986,351 | 10/1976 | Woods et al. | 123/90.15 |
| 4,205,634 | 6/1980 | Tourtelot, Jr. | 123/90.16 |
| 4,498,352 | 2/1985 | Hedelin | 123/90.17 |
| 4,517,934 | 5/1985 | Papez | 123/90.17 |
| 4,539,946 | 9/1985 | Hedelin | 123/48 A |
| 4,708,096 | 11/1987 | Mroz | 123/48 A |
| 4,722,315 | 2/1988 | Pickel | 123/90.15 |
| 4,799,466 | 1/1989 | Shibata et al. | 123/333 |
| 4,917,058 | 4/1990 | Nelson et al. | 123/316 |

FOREIGN PATENT DOCUMENTS

| | | |
|---|---|---|
| 3503365 | 8/1985 | Fed. Rep. of Germany . |
| 3816331 | 12/1988 | Fed. Rep. of Germany . |
| 2619856 | 3/1989 | France .............. 123/48 R |
| 0216033 | 8/1989 | Japan .................. 123/48 R |

Primary Examiner—David A. Okonsky
Assistant Examiner—Weilun Lo
Attorney, Agent, or Firm—Brumbaugh, Graves, Donohue & Raymond

[57] ABSTRACT

In the embodiment described in the specification a combustion chamber for an internal combustion engine has intake and exhaust valves arranged to scavenge the combustion chamber with fresh gas. The valve control for the intake valve is arranged so that the intake valve closing time is delayed with decreasing load and, to avoid a corresponding reduction of the compression ratio, the combustion chamber has a variable volume annex which reduces the combustion chamber volume with decreasing load.

9 Claims, 2 Drawing Sheets

INTERNAL COMBUSTION ENGINE PROVIDING SCAVENGING WITH COMBUSTION CHAMBER VOLUME CONTROL

BACKGROUND OF THE INVENTION

This invention relates to internal combustion engines having intake and exhaust valve timing arranged to provide fresh gas scavenging of the combustion chamber.

In external-ignition two-stroke internal combustion engines and, where appropriate, four-stroke engines, it is a known procedure to supply fresh gas (air in the case of direct fuel injection or a fuel-air mixture in the case of intake injection or carburetor engines) during an overlap of the open times of the intake and exhaust valve to force the exhaust generated in the combustion chamber during the preceding cycle through the open exhaust valve into an exhaust line. A disadvantage of this known procedure is that, with decreasing engine load, the supply of fresh gas transported into the combustion chamber is reduced so that, with declining engine load the exhaust content of the mixture in the combustion chamber, i.e. the residual combustion component, becomes greater, adversely affecting the speed and completeness of combustion as well as the ease of ignition.

SUMMARY OF THE INVENTION is an object of the present invention to provide an internal combustion engine arranged for fresh gas scavenging of the combustion chamber which overcomes the above-mentioned disadvantage of the prior art.

Another object of the invention is to provide a fresh gas scavenging internal combustion engine in which a desired partial quantity of fresh gas is supplied and a thoroughgoing scavenging of residual gas is also achieved. These and other objects of the invention are attained by providing an internal combustion engine in which the compression stroke is decreased with decreasing engine load by delaying the intake valve closing time, i.e. the valve closing angle, and in which the volume of the compression chamber is reduced with decreasing load.

The delay with decreasing engine load of at least the closing time (closing angle) of the intake valve (or, if there are several intake valves, the closing time of the last inlet valve to close) causes less fresh gas to be "trapped" in the combustion chamber than in full-load operation because of the reduced residual combustion chamber volume owing to the motion of the piston towards top dead center. Were this step to be taken alone, that is, merely reducing the fresh gas supply with decreasing load in the manner described, there would be the disadvantage of a reduced compression ratio because of the resulting reduction of the compression stroke with decreasing load. To avoid this, the invention provides for compression control by means of a reduction of the combustion chamber volume with decreasing engine load.

Appropriate arrangements for combustion chamber compression control are known. One such arrangement is described, for example, in German Offenlegungsschrift No. 3,503,365, the disclosure of which is incorporated by reference herein. Consequently, such arrangements need not be discussed in detail. In principle, such compression control arrangements provide an adjusting piston arranged in an annex to the combustion chamber, defining a variable supplementary combustion chamber volume which is increased or decreased depending on the location of the adjusting piston. The position of the adjusting piston is controlled as a function of load.

There are also known arrangements for varying valve action times as a function of load, so that they need not be described in detail. If the opening and closing times of all valves are made to shift to the same extent as a function of load, a device for angle adjustment of the valve cams or camshafts according to U.S. Pat. No. 3,496,918, the disclosure of which is incorporated by reference herein, may be employed. In that patent the lengths of the taut and slack sides of a timing belt which engages sprockets on the crankshaft of the engine and on the camshaft of the valve control system are varied in response to load signals.

If, instead, only a load-responsive displacement of the closing time of the intake valve (or of the last intake valve to close if there are several inlet valves) is required, then a device according to U.S. Pat. No. 4,517,934, the disclosure of which is incorporated herein, may be used. That patent describes a camshaft consisting of an inner shaft and a hollow shaft containing the inner shaft, the two shafts each bearing at least partial rotationally fixed cams so that the cams carried by the inner shaft pass with clearance through openings in the hollow outer shaft. Upon relative rotation of these two shafts, a change in cam length and/or a change in the location of the cam flanks in relation to each other takes place. According to the patent, this relative rotation may be controlled by electrical signals corresponding to engine load. Since such devices are fully disclosed in the prior art, they will not be described in detail herein.

In another embodiment of the invention, pure air is supplied during the overlap of the open phases of the intake and exhaust valves and a fuel-air mixture is provided after the exhaust valve closes. During the scavenging phase, that is, with the intake and exhaust valves simultaneously open, it is important to prevent fuel and/or a fuel-air mixture from passing through the open exhaust valve into the exhaust line. Therefore, an arrangement is provided to restrict the supply of any fuel-air mixture to an interval of time, or crank angle, that begins after the exhaust valve closes. During the scavenging phase, on the other hand, pure air is supplied to the combustion chamber. Here an arrangement like those described in German Offenlegungsschrift No. 3,816,331, which is incorporated herein, may be used. In this case separate inlet passages equipped with individual intake valves are provided for the scavenging air and the fuel-air mixture, and the actuation of the two intake valves is arranged so that, during the scavenging phase, only the inlet passage carrying pure air is connected to the combustion chamber and, after termination of the scavenging phase, only the mixture-carrying inlet passage is connected thereto.

Thus one advantage of the invention is that preexisting and proven arrangements may be used for its implementation.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
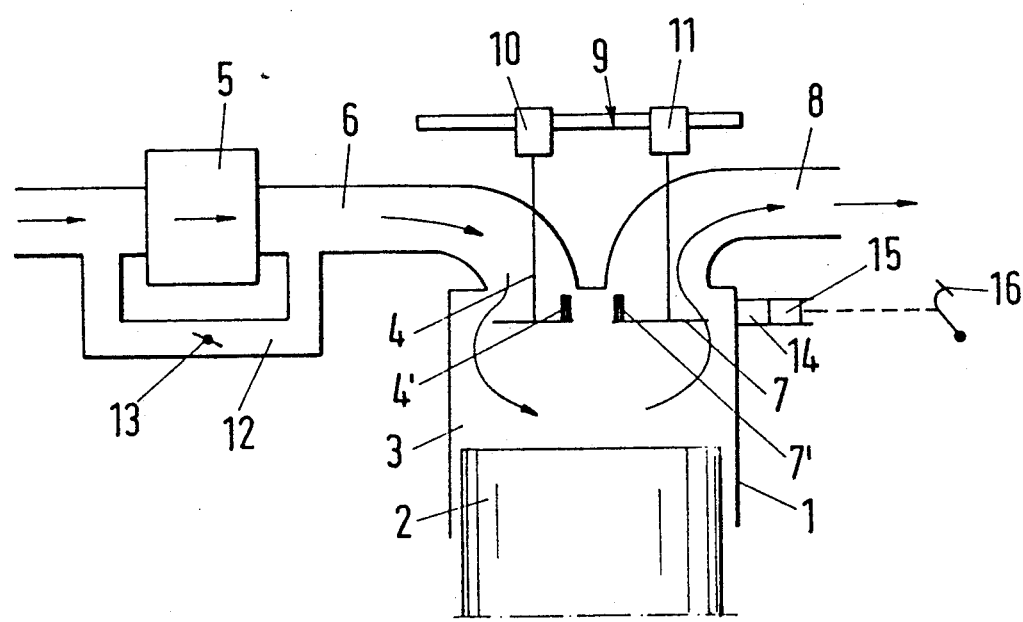
FIG. 1 is a schematic diagram, partially in longitudinal section, showing the relevant elements of an internal combustion engine in a representative embodiment of the invention.

In the typical embodiment of the invention shown in FIG. 1 a cylinder 1 has a piston 2 which is connected in the usual manner to a crankshaft of the engine by way of a piston rod (not shown), thereby providing a variable-volume combustion chamber 3. It will be understood that, as a rule, the engine will have several cylinders with pistons providing combustion chambers, which may be disposed one behind another in the direction normal to the plane of FIG. 1.

The combustion chamber 3 is supplied, by way of a conventional intake tappet valve 4 at appropriate times during the operation of the engine, with fresh gas which is delivered by a pump 5, for example a mechanical supercharger, through an inlet passage 6. Similarly, an exhaust tappet valve 7 provides an opening for exhaust to pass into an outlet passage 8 during the scavenging phases of the combustion chamber 3. A common camshaft 9 with intake and exhaust cams 10 and 11 is provided for the intake and exhaust valves 4 and 7. The shaft 9 is connected to the crankshaft of the engine and the valves 4 and 7 are actuated so that there is an overlap of the open phases of the valves for scavenging the combustion chamber 3 with a fresh gas supply. This overlap condition is illustrated in FIG. 1.

Although only one intake valve 4 and only one exhaust valve 5 are shown in FIG. 1, it will be understood that two or more intake valves and two or more exhaust valves may be used in each cylinder, in which case the last intake valve to close and the first exhaust valve to open are controlled in the described manner.

Within the combustion chamber 3, two flow baffles 4' and 7' inhibit direct short-circuit flow between the two valves 4 and 7 so that the fresh gas supplied during the scavenging phase forces exhaust gases out of the entire combustion chamber, including the regions near the piston, into the outlet passage 8 as indicated by the arrows.

The requisite flow of fresh gas is supplied by the pump 5. To limit this flow to levels sufficient for residual gas scavenging, a by-pass 12 around the pump 5 is fitted with a pressure control flap 13, which permits communication to a greater or lesser extent between outlet and inlet of the pump 5.

The camshaft 9 is associated with a conventional device of the type previously described and disclosed in detail in the cited prior art for the adjustment of the valve control times of all of the valves 4 and 7, which in this case is the same for both valves.

Figure 5:
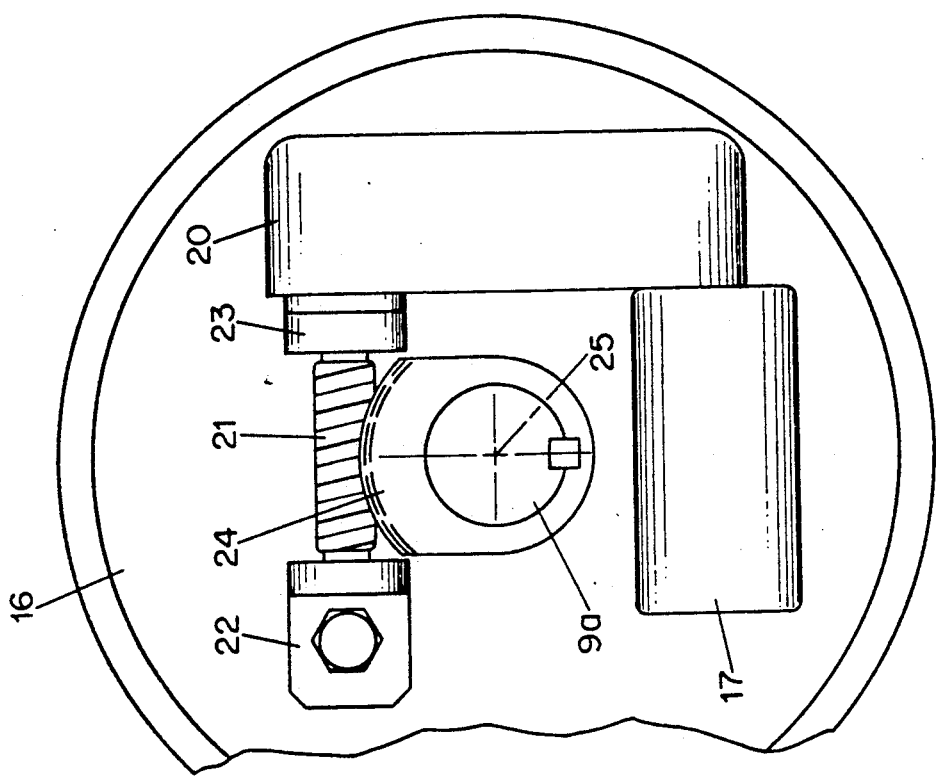
FIG. 5 is a front view, also in schematic form, of the arrangement illustrated in FIG. 4.
Figure 4:
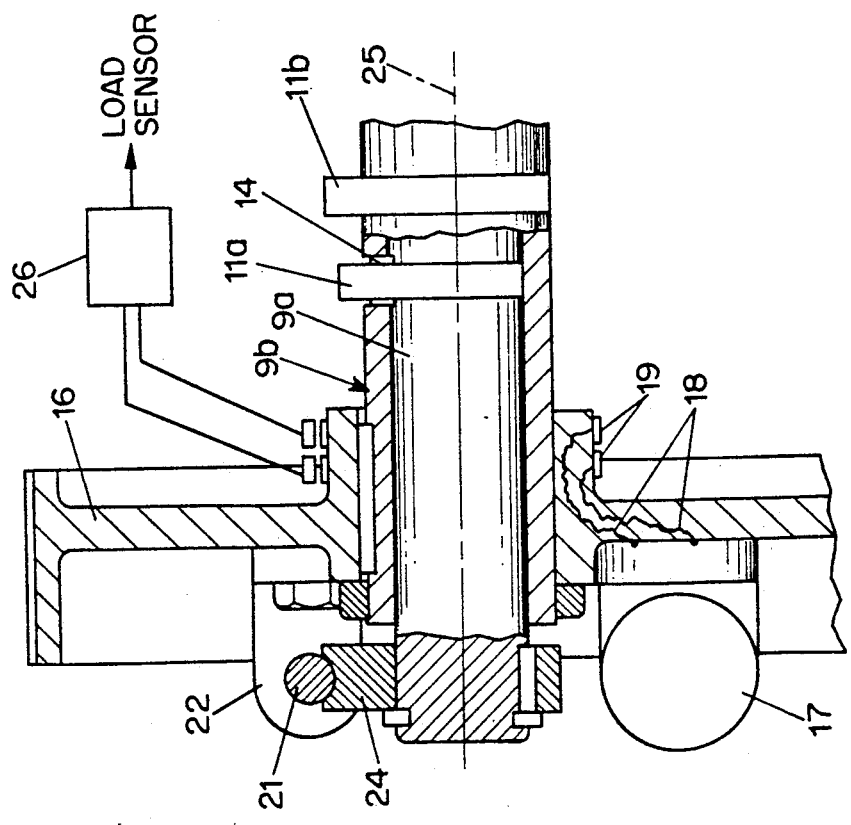
FIG. 4 is a longitudinal sectional view, in schematic form, showing an arrangement for varying valve opening and closing angles by changing the angle between the opening and closing flanks of a valve control cam.

A typical device for adjusting valve control times is shown in FIGS. 4 and 5. In this arrangement, the camshaft 9 consists of an inner shaft 9a concentrically surrounded by a hollow outer shaft 9b. A cam portion 11a, rigidly connected to the inner shaft 91, passes through an opening 14 in the outer shaft 9b. The outer hollow shaft 9b in turn carries a rigidly affixed cam portion 11b. The cam portions 11a and 11b are positioned to engage a cam follower acting on the exhaust valve 7 leading to the outlet passage 8 in FIG. 1, for example, so that, when either of the cam surfaces 11a and 11b engages the follower, the valve 7 is opened. In this manner, the cam portions combine to act as a compound cam which, through relative pivoting between the inner shaft 9a and the outer shaft 9b, provided variable cam length.

The camshaft is driven by a camshaft timing gear 16 which, in the embodiment of FIGS. 4 and 5, is fixedly attached on the hollow outer shaft 9b. The camshaft timing gear 16 is driven in a conventional manner by a timing belt or toothed gear from the internal combustion engine proper and is synchronized with the camshaft rotation.

The camshaft timing gear 16 carries at its left end in the orientation shown in FIG. 4 an electric motor 17. The motor 17 is connected electrically by way of wires 18 and slip rings 19 with stationary sliding contacts cooperating with the slip rings 19. The sliding contacts in turn are connected with any suitable electronic controlling device 26 which emits electric control signals for driving the electric motor 17 in response to the engine load. Accordingly, the signals cause the motor to rotate clockwise or counterclockwise, dependent upon the adjustment of the cam portions required to produce the above-described changes in valve operating time.

The output of the electric motor 17 drives a spindle 21 by way of gearing 20. The spindle 21 is supported by bearing blocks 22 and 23 on the end face of the camshaft timing gear 16. The threaded spindle 21, in turn, meshes with a gear segment 24 affixed to the inner camshaft 9a which is rotatable about the camshaft axis 25.

Figure 2:
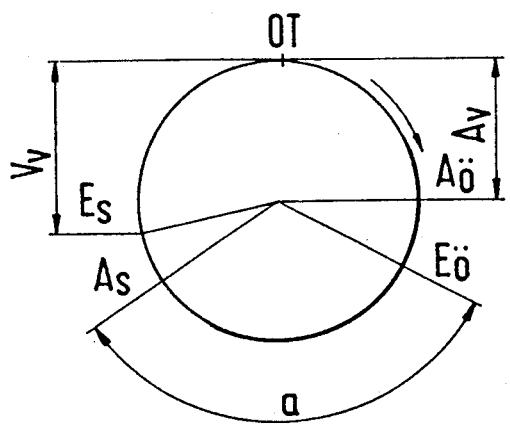
FIG. 2 is a schematic crank angle diagram showing the angles of valve actuation at full load.
Figure 3:
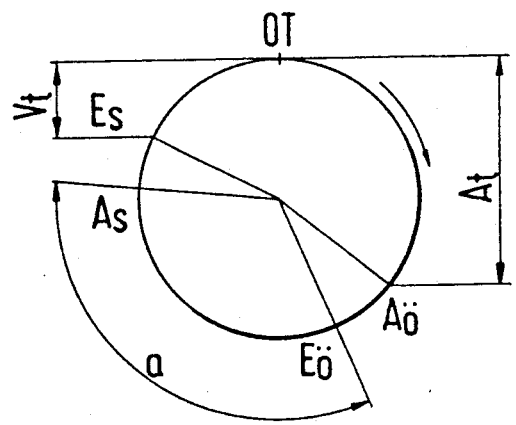
FIG. 3 is a diagram similar to FIG. 2 showing the valve actuation angles for a partial load condition.

The effect of this shaft in valve control times as a function of load is illustrated in FIGS. 2 and 3, which show the valve actuation times, at full load and partial load, respectively, in relation to the top dead center position OT of the piston 2.

In. FIG. 2 the crank angle cycle of the combustion chamber is indicated by the arrow so that the opening $A_ö$ of the exhaust valve 7 is followed by the opening $E_ö$ of the intake valve 4, and the scavenging or overlap of the open phases of the two valves, as indicated by the angle a, is ended by the closing $A_s$ of the exhaust valve. Then follows a purely charging phase which is terminated by the closing $E_s$ of the intake valve. Between this point in time, at the crankshaft angle $E_s$, and the top dead center OT, the full-load compression stroke $V_v$ takes place. The combustion chamber volume at $E_s$ is relatively large compared to the corresponding situation at partial load as shown in FIG. 3. In FIG. 3, all of the valve action times or angles are retarded during the crank angle cycle of the combustion chamber relative to the corresponding values in FIG. 2, while the scavenging angle a is maintained constant. This means that, in the partial-load case, the compression stroke $V_t$ is smaller than the full-load compression stroke $V_v$. The contrary applies to the power strokes $A_v$ and $A_t$, respectively. At partial load, upon the closing $E_s$ of the intake valve, there is a smaller combustion chamber volume than in the full load condition because of the higher position of the piston 2 so that a smaller volume of fresh gas is trapped in the combustion chamber.

It will be understood that the valve control arrangement may alternatively be so designed that the total open phase of only the intake is shifted.

To eliminate the disadvantage of a lower compression ratio under partial load conditions in accordance with the invention, the combustion chamber 3 is equipped with a compression control arrangement. In the embodiment schematically shown in FIG. 1, the combustion chamber 3 has an annex 14 in which a piston 15 is displaceable as a function of the engine load. The load relationship is suggested schematically in FIG. 1 by the broken line leading from an accelerator 16 of a motor vehicle equipped with the engine to the piston 15, but it will be understood that coupled motions of those components are in inverse relation. In other words, at partial load, the accelerator 16 moves to the right as viewed in FIG. 1 while the piston 15 moves to the left, which reduces the volume of the supplementary combustion chamber annex so that the compression ratio provided by the combustion chamber 3 for a given piston stroke is increased at low engine load.

The invention thus provides an internal combustion engine utilizing proven devices in which both a satisfactory residual gas scavenging and a fresh gas supply proportioned to the prevailing load are assured.

Although the invention has been described herein with reference to a specific embodiment, many modifications and variations thereof will readily occur to those skilled in the art. Accordingly, all such variations and modifications are included within the intended scope of the invention.

I claim:

1. An internal combustion engine comprising a cylinder having a piston movable therein and a combustion chamber, at least one intake valve communicating with the combustion chamber, at least one exhaust valve communicating with the combustion chamber, wherein the open phase of the intake valve and the closing phase of the exhaust valve overlap to permit combustion chamber scavenging, and wherein the compression stroke is defined by the closing time of the intake valve or of the intake valve last to close, respectively, and the top dead center position of the piston, valve control means including means for reducing the compression stroke with decreasing engine load by delaying the closing times of the intake valve or of the intake valve last to close, respectively, to reduce the quantity of fuel-air mixture supplied to the combustion chamber, and combustion chamber compression control means for reducing the volume of the combustion chamber with decreasing engine load.

2. An internal combustion engine according to claim 1 wherein the valve control means is arranged to shift both the opening and closing times of both the intake valve and the exhaust valve to the same extent.

3. An internal combustion engine according to claim 2 wherein the valve control means includes a rigid camshaft for actuating both the intake and exhaust valves which is provided with both a rotational drive means and a cam angle shifting drive means responsive to signals representing engine load.

4. An internal combustion engine according to claim 1 wherein the valve control means includes means for shifting only the closing time of the intake valve or of the intake valve last to close, respectively, as a function of engine load.

5. An internal combustion engine according to claim 4 wherein the means for shifting the closing time of the intake valve or of the intake valve last to close, respectively, includes a camshaft having an intake valve control cam with a terminal flank which is adjustable int eh direction of rotation relative to the initial flank by means of an angle-shifting drive means responsive to signals representing engine load.

6. An internal combustion engine according to claim 1 including means for supplying pure air to the combustion chamber during the overlap of the open phases of intake and exhaust valves and means for supplying a fuel-air mixture to the combustion chamber after closing of the exhaust valve.

7. An internal combustion engine according to claim 1 including means for supplying fresh gas to the intake valve wherein the closing times of the intake and exhaust valves or of the intake and exhaust valves last to close, respectively, are sufficiently close together that fresh gas is prevented from backing up through the intake valve.

8. An internal combustion engine according to claim 1 including means for supplying fresh gas to the intake valve and means for controlling the fresh gas pressure to a value that limits the fresh gas throughput to the quantity required for scavenging of residual gas from the combustion chamber.

9. An internal combustion engine according to claim 8 wherein the means for supplying fresh gas to the intake valve comprises a conduit containing a pump and including a bypass conduit to bypass the pump and a throttle member in the bypass conduit.

* * * * *